US010282230B2

(12) United States Patent
McKenney

(10) Patent No.: US 10,282,230 B2
(45) Date of Patent: May 7, 2019

(54) FAIR HIGH-THROUGHPUT LOCKING FOR EXPEDITED GRACE PERIODS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 15/283,471

(22) Filed: Oct. 3, 2016

(65) Prior Publication Data
US 2018/0095666 A1 Apr. 5, 2018

(51) Int. Cl.
G06F 9/52 (2006.01)
G06F 9/50 (2006.01)

(52) U.S. Cl.
CPC ............... G06F 9/50 (2013.01); G06F 9/526 (2013.01)

(58) Field of Classification Search
None
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 4/1997 | Slingwine et al. | |
| 5,727,209 A | 3/1998 | Slingwine et al. | |
| 393,226 A | 4/1998 | Shenhav | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | Vlckenney | |
| 7,287,135 B2 | 10/2007 | McKenney et al. | |
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Edward J Dudek, Jr.
*Assistant Examiner* — Ralph A Verderamo, III
(74) *Attorney, Agent, or Firm* — Walter W. Duft

(57) ABSTRACT

An updater needing an expedited RCU grace period may initiate a leaf-to-root traversal of a funnel lock embodied as a hierarchical tree of nodes. For each accessed node, the updater may check an indicator to determine if another updater needing the same expedited grace period has visited the node. If true, the updater may add itself to a waitqueue of updaters waiting for the expedited RCU grace period. If false, the updater may set the indicator to indicate it has visited the node, and then continue to a next node. If the updater reaches the root node with no indication that any other updater needing the expedited RCU grace period has visited the nodes accessed by the updater, the updater may, while holding a mutex lock, start a new expedited RCU grace period and at the end thereof wake up other updaters waiting on the expedited RCU grace period.

20 Claims, 8 Drawing Sheets

(56) References Cited

U.S. PATENT DOCUMENTS

| | | | |
|---|---|---|---|
| 7,472,228 B2 | 12/2008 | McKenney et al. | |
| 7,653,791 B2 | 1/2010 | McKenney | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 9,189,413 B2 | 11/2015 | McKenney | |
| 9,250,978 B2 | 2/2016 | McKenney | |
| 9,256,476 B2 | 2/2016 | McKenney | |
| 9,348,765 B2 | 5/2016 | McKenney | |
| 9,389,925 B2 | 7/2016 | McKenney | |
| 2008/0082532 A1 | 4/2008 | McKenney | |
| 2013/0061071 A1 | 3/2013 | McKenney | |
| 2014/0379678 A1* | 12/2014 | McKenney | G06F 17/30359 707/704 |
| 2014/0380084 A1 | 12/2014 | McKenney | |
| 2015/0153817 A1* | 6/2015 | McKenney | G06F 9/5094 713/323 |
| 2015/0286586 A1* | 10/2015 | Yadav | G06F 9/528 711/152 |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al, "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document Slab_Destroy_By_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN. net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN. net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.Little", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
Anonymous, "Method to increase throughput in a shared disk database through the use of 'unfair' locking", ip.com, IPCOM000206071D, Apr. 13, 2011, 3 pages.
Anonymous, "Throttling RCU updates to conserve memory", ip.com, IPCOM000224867D, Jan. 8, 2013, 4 pages.

(56) References Cited

OTHER PUBLICATIONS

Anonymous, "Expedited RCU Grace Periods with Improved Energy Efficiency", ip.com IPCOM000242015D, Jun. 15, 2015, 2 pages.
P. McKenney, "Expedited grace period changes for 4.3", LWN.net, Jul. 17, 2015, 2 pages.
D. Sarma et al., "Linux/kernel/rcu/tree.c", Linux version 4.3, Jul. 2015, 65 pages.
D. Sarma et al, "Linux/kernel/rcu/tree.c/exp_funnel_lock function", Linux version 4.3, Jul. 2015, 1 page.

* cited by examiner

FAIR HIGH-THROUGHPUT LOCKING FOR EXPEDITED GRACE PERIODS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed to be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution may be treated as implicit quiescent states. More generally, a quiescent state may be delineated by a kernel code path being outside an RCU read-side critical section. RCU read-side primitives such as rcu_read_lock( ) and rcu_read_unlock( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Some RCU implementations provide both normal RCU grace periods and expedited RCU grace periods. In the Linux® kernel, a normal RCU grace period may be initiated by way of a call to the synchronize_rcu( ) or synchronize_sched( ) primitives whereas a call to the synchronize_rcu_expedited( ) or synchronize_sched_expedited( ) primitives initiates an expedited RCU grace period. Expedited RCU grace periods can be orders of magnitude faster than normal RCU grace periods and are thus useful for latency-sensitive operations.

In RCU implementations found in previous versions of the Linux® kernel dating back to version 4.3, the synchronize_rcu_expedited( ) and synchronize_sched_expedited( ) primitives have utilized a sequence-counter scheme to allow multiple concurrent requests for an expedited RCU grace period to be satisfied by a single expedited RCU grace-period computation. This sequence-counter scheme in some ways resembles a sequence lock. The counter is incremented at the beginning and at the end of a given expedited RCU grace-period computation. If the sequence counter has an odd value, an expedited RCU grace-period computation is in progress. If the sequence counter has an even value, the expedited RCU grace-period processing either is idle or is transitioning between a pair of consecutive expedited RCU grace-period computations. Any given expedited RCU grace period request may take a snapshot of the sequence counter, and at various times evaluate the snapshot relative to the subsequent sequence counter values. If the sequence counter has advanced to or beyond a specified value, a concurrent expedited RCU grace-period computation has satisfied the current request.

In the above-mentioned previous Linux kernel versions, the expedited RCU grace period sequence counter is stored in an rcu_state data structure named rsp. The expedited RCU grace period sequence counter is named rsp→expedited_sequence. The rcu_state structure includes a combining tree of rcu_node data structures, each named rnp. A single root rcu_node structure lies at the top of the rcu_node hierarchy. Some number of leaf level rcu_node structures lie at the bottom of the rcu_node hierarchy, and zero or more intermediate level rcu_node structures may lie between the root and leaf levels of the hierarchy. Each leaf level rcu_node structure serves some number of CPUs, with each CPU being represented by a per-CPU rcu_data structure named rdp. The rcu_node hierarchy is used to provide a mutex-based funnel locking scheme that serializes write access to the rsp→expedited_sequence counter without undue contention at the start of expedited RCU grace periods. According to this funnel locking scheme, each rcu_node structure is protected by a mutex lock named rnp→exp_funnel_mutex. Each rcu_data structure maintains its own mutex lock named rdp→exp_funnel_mutex.

Updaters needing an expedited RCU grace period initially snapshot the rsp→expedited_sequence counter, then initiate a leaf-to-root traversal of the rcu_node hierarchy. Starting from one of the per-CPU rcu_data structures, each updater performs a sequence of →exp_funnel_mutex lock acquisition and release operations to proceed up the hierarchy. The first updater to reach the root rcu_node structure and acquires its rnp→exp_funnel_mutex lock is authorized to advance the rsp→expedited_sequence counter and start a new expedited RCU grace period.

Multiple concurrent requests for expedited RCU grace periods are satisfied by having each updater check the rsp→expedited_sequence counter each time the updater accesses its rcu_data structure or an rcu_node structure and acquires the structure's →exp_funnel_mutex lock. If the rsp→expedited_sequence counter indicates that the expedited RCU grace period needed by the updater has ended, the updater's work is done. If the rsp→expedited_sequence counter indicates that the expedited RCU grace period needed by the updater has not ended, the updater moves up one level on its pathway to the root level rcu_node structure. If the updater currently holds the rdp→exp_funnel_mutex lock of its rcu_data structure, it acquires the rnp→exp_funnel_mutex lock of a leaf level rcu_node structure, then releases the rdp→exp_funnel_mutex lock of the rcu_data structure. If the updater currently holds the rnp→exp_funnel_mutex lock of an rcu_node structure, it acquires the rnp→exp_funnel_mutex lock of the current rcu_node structure's parent, then releases the current rcu_node structure's rnp→exp_funnel_mutex lock. As previously noted, the updater performs a check of the rsp→expedited_sequence counter each time it moves from one→exp_funnel_mutex lock-protected data structure to another.

If an updater reaches the root level rcu_node structure and successfully acquires its rnp→exp_funnel_mutex lock, it means that no concurrent updater ended this updater's expedited RCU grace period during its traversal up the rcu_node hierarchy. As noted above, the updater will therefore increment the rsp→expedited_sequence counter to start a new expedited RCU grace period. The updater will then release the root level rcu_node structure's rnp→exp_funnel_mutex lock, wait for the new expedited RCU grace period to end, and then increment the rsp→expedited_sequence counter again.

The foregoing funnel locking scheme achieves the goal of reducing lock contention by ensuring that, for each level of the rcu_node hierarchy, only a small fraction of updaters need to advance to the next level and contend for an rcu_node structure's rnp→exp_funnel_mutex lock. In version 4.3 of the Linux® kernel, at most 64 CPUs will be contending for any given rcu_node structure's rnp→exp_funnel_mutex lock at a time, assuming RCU_FANOUT kernel configuration parameter is set to its default value.

Unfortunately, the above-described funnel locking scheme can result in unfairness and undue delays because of out-of-order lock grant and timing issues. Different updaters may take different pathways through the rcu_node hierarchy, depending on their rcu_data structure and the leaf rcu_node structure to which it is assigned. A scenario may occur in which updaters on some pathways through the rcu_node hierarchy are delayed in acquiring rnp→exp_funnel_mutex locks due to lock contention from updaters on other pathways, and so are delayed in moving up the hierarchy. As noted above, an updater can only determine if its expedited RCU grace period has ended by checking the rsp→expedited_sequence counter, and such checks are only made when the updater moves up from its rcu_data structure to an rcu_node structure, or from one rcu_node structure to another, acquiring and releasing→exp_funnel_mutex locks as they go. If updaters on a given pathway cannot move up because updaters on a different pathway are winning the race for →exp_funnel_mutex lock acquisition, such updaters will languish until such time as they are able to advance up the hierarchy. Although priority-inversion-compensating locking primitives such as rt_mutex can in some cases address this unfairness, such "fair" locking primitives have several drawbacks, including:

1. They are unfair by design in the presence of tasks running at different real-time priorities;
2. They cannot help in the presence of low-contention fastpath optimizations; and
3. They are not available for all architectures in the Linux® kernel, so cannot be used in core kernel code as exemplified by RCU.

There is therefore a need for some mechanism that provides the contention-control benefits of funnel locking for expedited RCU grace periods, but which avoids the above-discussed unfairness issues and which may be used by core Linux® kernel code.

SUMMARY

A method, system and computer program product are provided for detecting expedited read-copy update (RCU) grace periods using funnel locking with waitqueues. An RCU updater may determine a future expedited RCU grace period needed to guarantee that a full expedited RCU grace period has elapsed following a current expedited RCU grace period. The RCU updater may initiate a leaf-to-root traversal of a funnel lock embodied as a hierarchical tree of nodes having a single top level root node, a plurality of bottom level leaf nodes, and zero or more intermediate level nodes. For each node of the funnel lock accessed during the leaf-to-root traversal, the RCU updater may check an indicator to determine if another RCU updater needing the future expedited RCU grace period has visited the node. If true, the RCU updater may be added to a waitqueue of RCU updaters waiting for the future expedited RCU grace period. If false, the indicator may be set to indicate that the RCU updater needing the future expedited RCU grace period has visited the node, and the RCU updater may continue to a next node of the funnel lock. If the RCU updater reaches the root node with no indication that any other RCU updater needing the future expedited RCU grace period has visited any of the nodes accessed by the RCU updater, the RCU updater may acquire an expedited RCU grace period mutex lock that serializes expedited RCU grace period operations, start a new expedited RCU grace period, wait for the new expedited RCU grace period to elapse, release the expedited RCU grace period mutex lock, and initiate a wakeup operation that wakes up other RCU updaters waiting on waitqueues associated with the elapsed new expedited RCU grace period.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
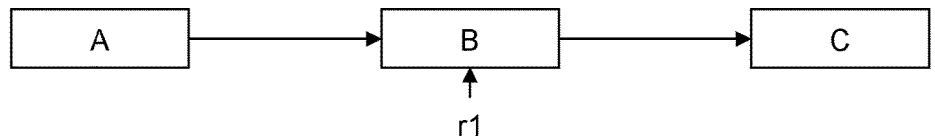
FIGS. 1A-1D are diagrammatic representations of a linked list of data elements undergoing a data element replacement according to a conventional read-copy update mechanism.
Figure 1B:
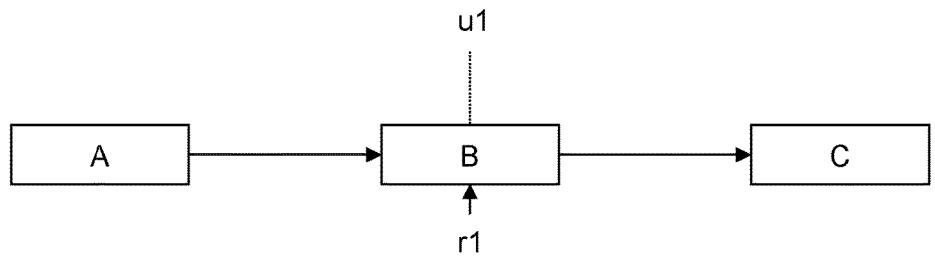
Figure 1C:
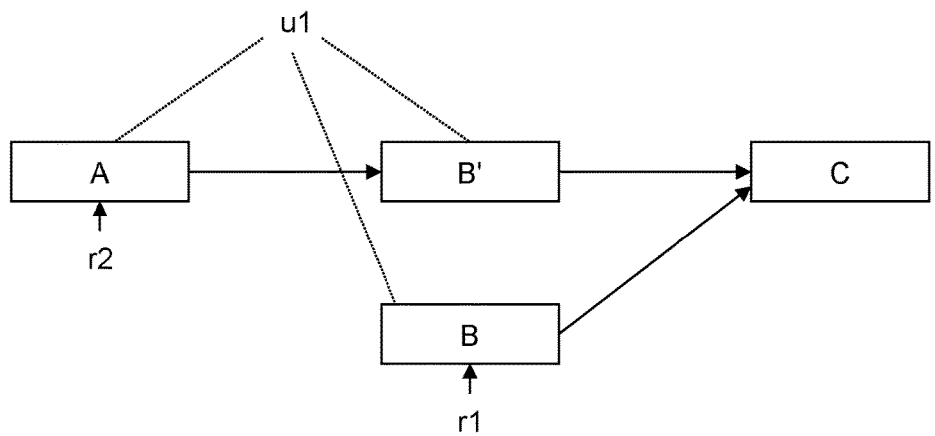
Figure 1D:
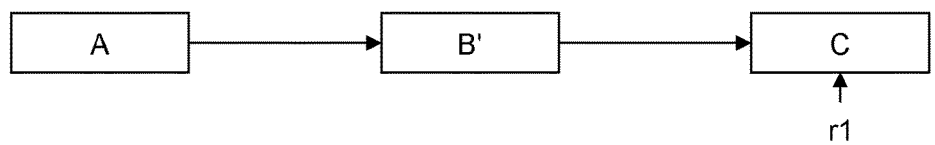
Figure 2A:
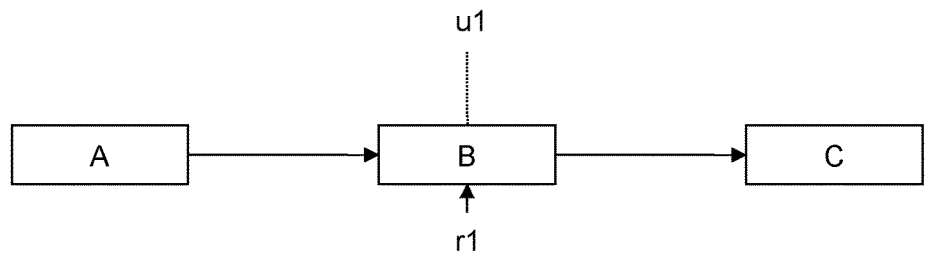
FIGS. 2A-2C are diagrammatic representations of a linked list of data elements undergoing a data element deletion according to a conventional read-copy update mechanism.
Figure 2B:
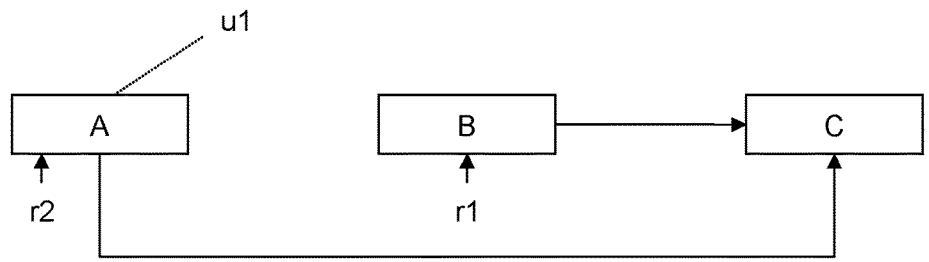
Figure 2C:
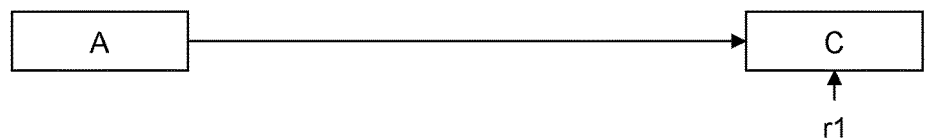
Figure 3:
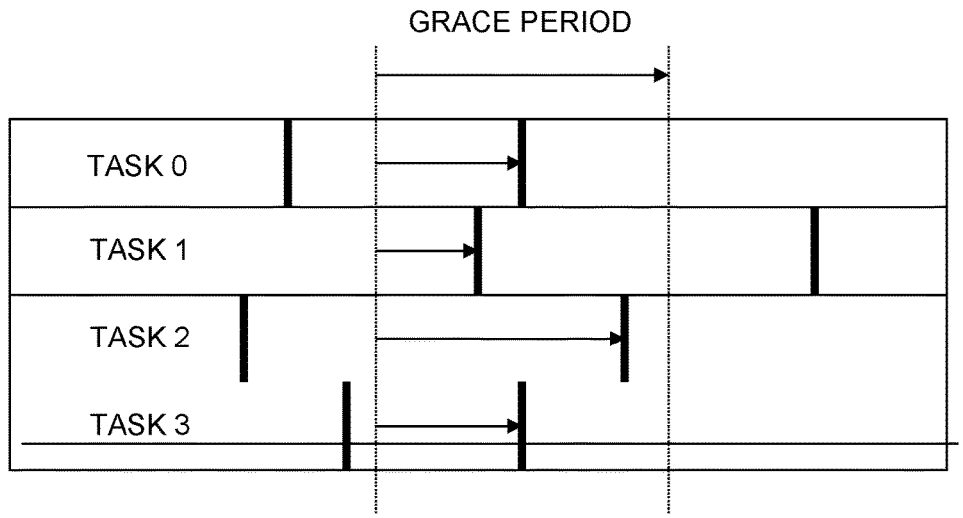
FIG. 3 is a flow diagram illustrating an example prior art grace period in which four processes pass through a quiescent state.
Figure 4:
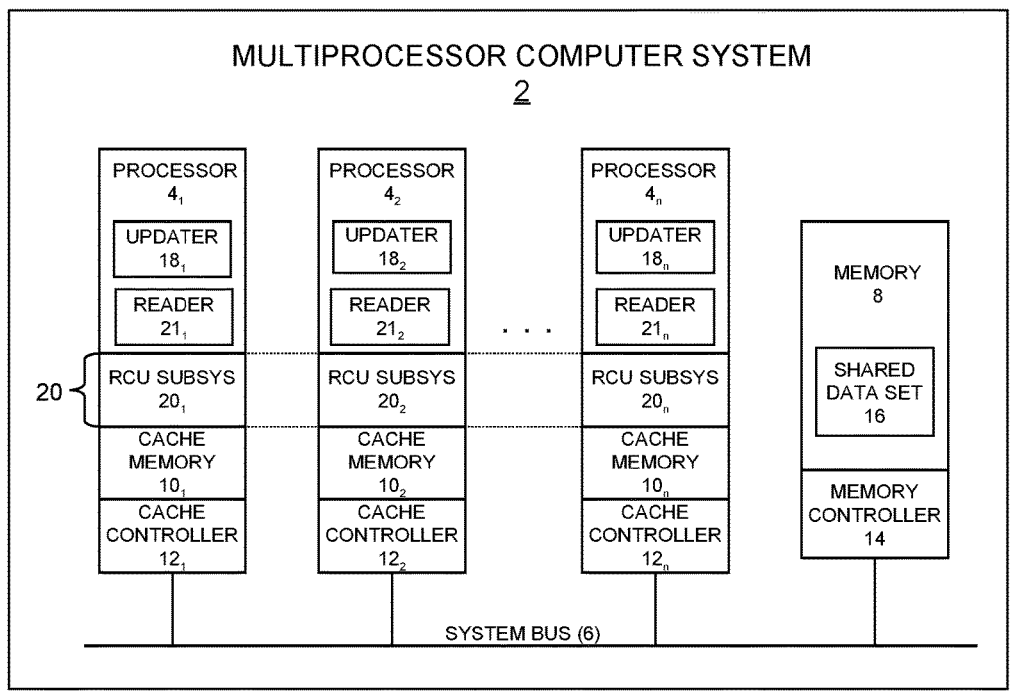
FIG. 4 is a functional block diagram showing a multiprocessor computing system.

Turning now to the Figures, wherein like reference numerals represent like elements in all of the several views, FIG. 4 illustrates an example multiprocessor computer system 2 in which a technique for short-circuiting normal RCU grace period computations in the presence of expedited RCU grace periods may be implemented. In FIG. 4, the computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, as previously mentioned, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run from program instructions stored in the memory 8 (or elsewhere) in order to periodically perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may respectively periodically execute on the several processors $4_1, 4_2 \ldots 4_n$. Operational details of the RCU subsystem 20 are described below.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may call an RCU primitive such as synchronize_rcu( ), synchronize_sched( ), synchronize_rcu_expedited( ), or synchronize_sched_expedited( ), to invoke the RCU subsystem 20 to track a normal or expedited RCU grace period for deferred destruction of the pre-update view of the data (second-phase update). The normal or expedited grace period processing performed by the RCU subsystem 20 may entail starting new grace periods and detecting the end of old grace periods so that the RCU subsystem 20 may determine when it is safe to free stale data (or take other actions).

Figure 5:
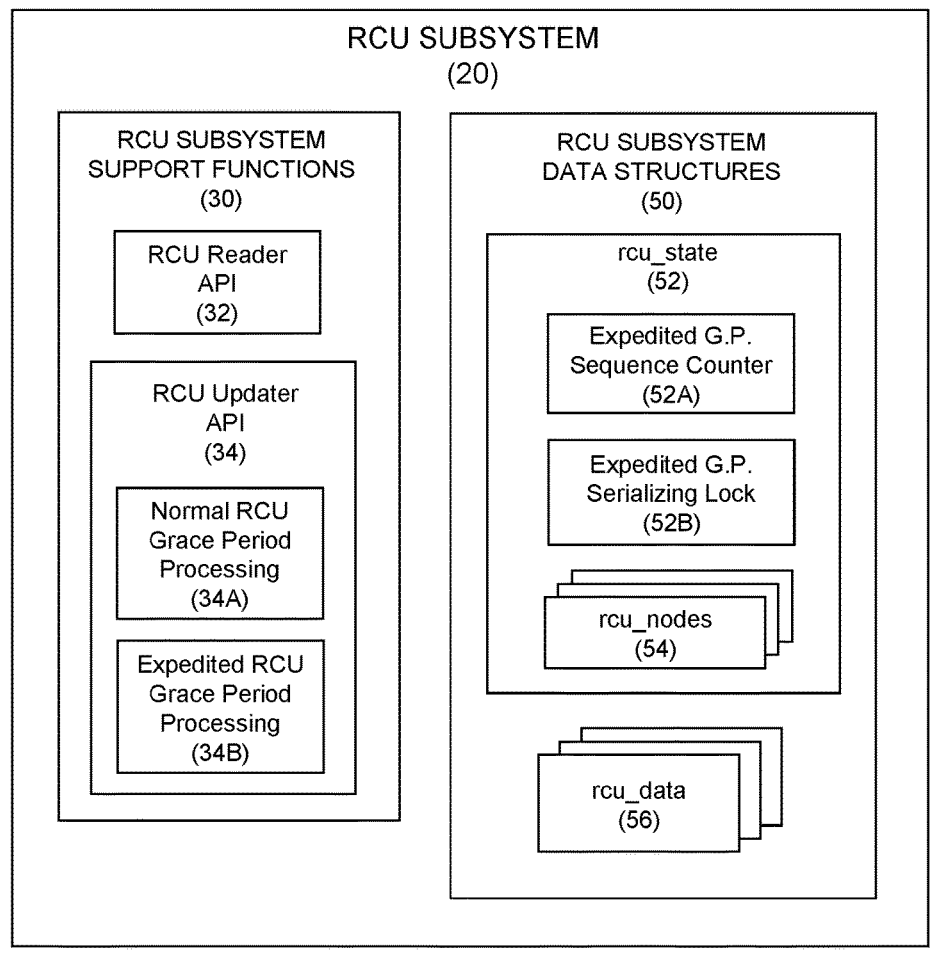
FIG. 5 is a functional block diagram showing an example RCU subsystem.

Turning now to FIG. 5, example components of the RCU subsystem 20 are shown. Among these components is a set of RCU subsystem support functions 30, namely, an RCU reader API (Application Programming Interface) 32 and an RCU updater API 34.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may comprise a normal RCU grace period processing component 34A and an expedited RCU grace period processing component 34B. The normal RCU grace period component 34A may include synchronization primitives such as synchronize_rcu( ) or synchronize_sched( ) for use by updaters 18 to defer the removal of shared data 16 that may be referenced by the readers 21 until a normal RCU grace period has elapsed. These functions, which may be implemented in the context of a kernel thread (e.g. a Linux® kthread), perform normal RCU grace period processing that may include starting new normal RCU grace periods and detecting the end of old normal RCU grace periods by waiting for CPUs in the computer system 2 to pass through quiescent states.

The expedited RCU grace period component 34B may include synchronization primitives such as synchronize_rcu_expedited( ) or synchronize_sched_expedited( ) for use by updaters 18 to defer the removal of shared data 16 that may be referenced by the readers 21 until an expedited RCU grace period has elapsed. These functions, which may be implemented in the context of a kernel thread (e.g. a Linux® kthread) that differs from that used for normal RCU grace period processing, perform expedited RCU grace processing that may include starting new expedited RCU grace periods and detecting the end of old expedited RCU grace periods by actively initiating quiescent states on the CPUs in the computer system 2. In an example embodiment, this may be done by sending an interprocessor interrupt (IPI) to all non-idle non-nohz (tickless) online CPUs. The IPI handler may check whether the CPU is in an RCU read-side critical section, and if so, it may set a flag in the CPU's rcu_data structure that causes the outermost rcu_read_unlock operation (in a set of nested invocations of this read-side RCU primitive) to report the quiescent state. On the other hand, if the CPU is not in an RCU read-side critical section, the IPI handler may report the quiescent state immediately. In a typical RCU implementation, an expedited RCU grace period may be an order of magnitude faster than an normal RCU grace period.

With continuing reference now to FIG. 5, the RCU subsystem 20 may further include a set of RCU subsystem data structures 50. These data structures include an rcu_state structure (rsp) 52 having embedded therein (e.g., as a linear array) a combining tree of rcu_node structures (rnp) 54. The RCU subsystem 20 thus supports hierarchical grace period detection, and may be characterized as a hierarchical RCU implementation. The tree of rcu_node structures tracks information needed to determine when RCU grace periods have elapsed. Each leaf rcu_node structure 54 may additionally have a set of a per-processor rcu_data structures (rdp) 56 assigned to it. Each rcu_data structure 56 represents one CPU in the computer system 2 and can be used to maintain rcu-related information specific to that CPU, such as RCU callback lists, quiescent-state and grace-period handling information, and other data.

As discussed in the "Background" section above, some existing RCU implementations use a funnel locking scheme that employs rnp→exp_funnel_mutex locks at each level of the rcu_node hierarchy to reduce lock contention by RCU updaters seeking to initiate expedited RCU grace periods. However, as also previously noted, such funnel locking can result in unfairness and undue delays because of out-of-order lock grant and timing issues.

A solution to this problem that may be implemented by the system 2 is to use funnel locking with waitqueues to prevent any RCU updaters 18 needing expedited RCU grace periods from being blocked by other updaters as they traverse the funnel lock. A wakeup pass at the end of each expedited RCU grace period ensures that all updaters waiting on a just-completed expedited RCU grace period are awakened in a timely fashion. A low-contention fastpath for the funnel lock may be provided that does not result in delaying updaters waiting on prior expedited RCU grace periods. Advantageously, RCU updaters 18 traversing the funnel lock disclosed herein need not contend with per-node rnp→exp_funnel_mutex locks that can unduly delay updaters on certain funnel lock pathways.

Figure 6:
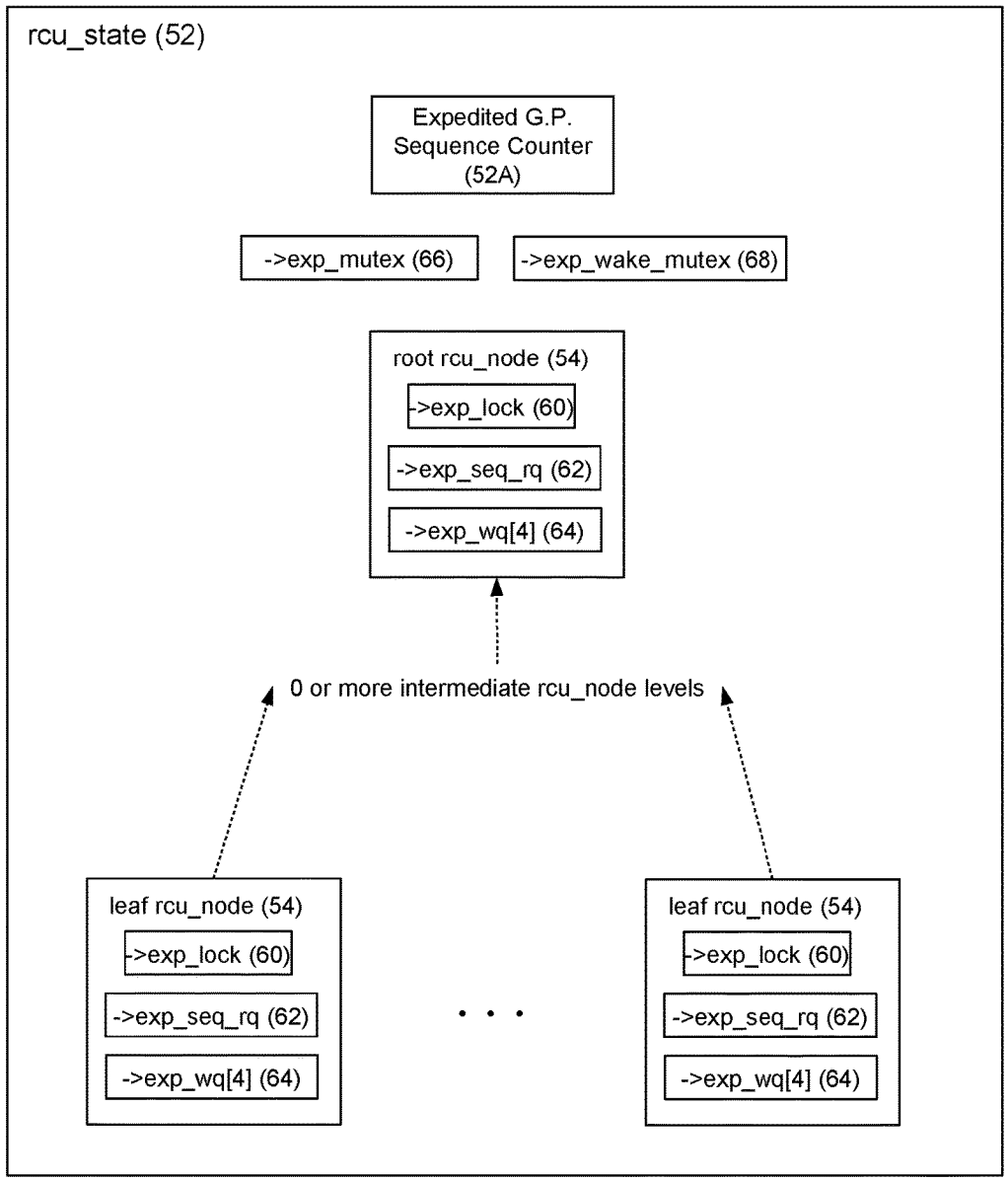
FIG. 6 is a functional block diagram showing an example RCU combining tree.

In an embodiment, an RCU updater 18 may determine a future expedited RCU grace period needed to guarantee that a full expedited RCU grace period has elapsed following a current expedited RCU grace period. The RCU updater 18 may initiate a leaf-to-root traversal of a funnel lock embodied as a hierarchical tree of nodes having a single top level root node, a plurality of bottom level leaf nodes, and zero or more intermediate level nodes. FIG. 6, described in more detail below, illustrates one possible embodiment of the funnel lock. For each node of the funnel lock accessed during the leaf-to-root traversal, the RCU updater 18 may check an indicator to determine if another RCU updater needing the future expedited RCU grace period has visited the node. If true, the RCU updater 18 may be added to a waitqueue of RCU updaters waiting for the future expedited RCU grace period. If false, the RCU updater 18 may set the indicator to indicate to other RCU updaters that it has visited the node and needs the future expedited RCU grace period. The RCU updater 18 may then continue to a next node of the funnel lock and repeat the above processing. If the RCU updater reaches the root node of the funnel lock with no indication that any other RCU updater needing the future expedited RCU grace period has visited any of the nodes accessed by the RCU updater, the RCU updater may acquire an expedited RCU grace period mutex lock that serializes expedited RCU grace period operations, start a new expedited RCU grace period, wait for the new expedited RCU grace period to elapse, release the expedited RCU grace period mutex lock, and initiate a wakeup operation that wakes up other RCU updaters waiting on waitqueues associated with the elapsed new expedited RCU grace period.

FIG. 6 illustrates an embodiment in which the funnel lock node hierarchy may be provided by the hierarchy of rcu_node structures 54 that are part of the rcu_state structure 52 of FIG. 5. In this embodiment, which is shown by way of example only, each rcu_node structure 54 may be provided with fields 60, 62 and 64 that can be used to support funnel locking with waitqueues as disclosed herein.

The field 60 is a spinlock that may for convenience be named rnp→exp_lock. The rnp→exp_lock 60 guards a field 62 that may be used to provide the above-mentioned indicator for indicating whether a node of the funnel lock has been visited by an RCU updater 18 waiting for a particular expedited RCU grace period.

The field 62 may for convenience be named rnp→exp_seq_rq. The rnp→exp_seq_rq indicator 62 may store an expedited RCU grace period number s that represents the future expedited RCU grace period needed by the RCU updater 18 that sets the indicator. Each rnp→exp_seq_rq indicator 62 may serve as one of a set of per-node indicators collectively maintained by the rcu_node structures 54, with each of the per-node indicators being protected by an indicator spinlock, namely, an rnp→exp_lock 60.

The field 64 represents an array of waitqueues that may for convenience be a four element array named rnp→exp_wq [4]. Each waitqueue may be used to hold a list of RCU updaters 18 that are waiting on a particular expedited RCU grace period s, and may represent one of a set of per-node waitqueues maintained by the rcu_node structures 54. Each rcu_node structure 54 may have one rnp→exp_wq [4] array 64 that provides its waitqueue set.

As will be described in more detail below, during expedited RCU grace period operations, the rnp→exp_seq_rq indicator 62 of any given rcu_node structure 54 may be used by RCU updaters 18 to detect whether some earlier RCU updater has already visited the same rcu_node structure and will be carrying out a particular expedited RCU grace period s. If this is the same expedited RCU grace period s needed by the later RCU updaters 18, the later RCU updaters may wait on the appropriate element of the rnp→exp_wq [4] array 64 to be awakened at a subsequent time. In the illustrated embodiment, the "appropriate element" of the rnp→exp_wq [4] array 64 may be the third-from-bottom and second-from-bottom bits of the future expedited RCU grace period number s associated with the RCU updater 18 that checks the rnp→exp_seq_rq indicator 62. As described in more detail below, the value of s may be determined from an expedited RCU grace period sequence counter 52A (see FIGS. 5 and 6) maintained by the rcu_state structure 52. The reason that the bottom bit of the future expedited RCU grace period number s need not be used when an RCU updater 18 determines the appropriate element of the rnp→exp_wq [4] array 64 is because the bottom bit of the expedited RCU grace period sequence counter 52A may merely serve to indicate whether or not an expedited grace period is currently in progress.

In the rnp→exp_wq [4] array 64 of the present embodiment, four waitqueues are provided because wakeups for one expedited RCU grace period may be performed concurrently with the execution of the next expedited RCU grace period. A first waitqueue of the rnp→exp_wq [4] array 64 may contain RCU updaters 18 waiting on a previous expedited RCU grace period. A second waitqueue of the rnp→exp_wq [4] array 64 may contain RCU updaters 18 waiting on the current expedited RCU grace period. A third waitqueue of the rnp→exp_wq [4] array 64 may contain RCU updaters 18 waiting on the next expedited RCU grace period. The fourth waitqueue of the rnp→exp_wq [4] array 64 may be used to simplify the bit arithmetic. As described in more detail below, after a given expedited RCU grace period s has completed, all RCU updaters 18 waiting on the corresponding element of the rnp→exp_wq [4] array 64 of each rcu_node structure 54 may be awakened. This may be handled by a workqueue or other type of deferred processing.

With continuing reference to FIG. 6, the rcu_state structure 52 may be used to maintain the previously-mentioned expedited RCU grace period sequence counter 52A. The sequence counter 52A is a feature of existing RCU implementations in the Linux® kernel. It is used to count elapsed expedited RCU grace periods. The sequence counter 52A is incremented at the beginning and end of each expedited RCU grace period by an RCU updater 18 invoking the expedited RCU grace period processing component 34B. As per existing RCU implementations, the sequence-counter 52A allows multiple concurrent requests for an expedited RCU grace period to be satisfied by a single expedited RCU grace-period computation. If the sequence counter 52A has an odd value, an expedited RCU grace-period computation is in progress. If the sequence counter 52A has an even value, the expedited RCU grace-period component 34B either is idle or is transitioning between a pair of consecutive expedited RCU grace-period computations. If the sequence counter has a value s' at a given time, then once the sequence counter reaches the value s=((s'+3) & ~0x1), a full expedited RCU grace period computation is guaranteed to have elapsed. The foregoing expression adds 3 to the value s' and then clears the bottom bit. It will be appreciated that the expression will produce a final value of s=s'+2 whenever the s'+3 sum is an odd number, and will produce a final value of s=s'+3 whenever the s'+3 sum is an even number. Readers that begin their RCU read-side critical sections while s' is an odd value (i.e., an expedited RCU grace period is underway) will be protected by having their data preserved until at least the end of expedited RCU grace period s=s'+3, which represents the next expedited RCU grace period following the current one. Readers 21 that began their RCU read-side critical sections while s' is an even value (i.e., an expedited RCU grace period is not underway) will be protected by having their data preserved until at least the end of expedited RCU grace period s=s'+2, which is the next expedited RCU grace period to begin.

Any given RCU updater 18 may take a snapshot of the sequence counter 52A, calculate the required future expedited RCU grace period s determined from the expression above, and at various times compare s to a subsequent value of the sequence counter to see if the subsequent value is equal to or greater than s. In current versions of the Linux® kernel, the snapshotting of the sequence counter 52A and the computation of the future expedited RCU grace period s needed by the RCU updater 18 is carried out by the rcu_exp_gp_seq_snap( ) function. The comparison of s to the subsequent value of the sequence counter 52A is carried out by the rcu_exp_gp_seq_done( ) function. If the sequence counter 52A has advanced to or beyond the value specified by s, a concurrent expedited RCU grace-period computation has satisfied the current request.

With continuing reference to FIG. 6, the rcu_state structure 52 may be provided with two mutex lock fields 66 and 68. The field 66 of the rcu_state structure 52 may for convenience be named rsp→exp_mutex, and may be used to implement the expedited RCU grace period mutex lock that serializes expedited RCU grace period operations. The rsp→exp_mutex lock 66 may be acquired by an RCU updater 18 that successfully reaches the root rcu_node structure 54 of the funnel lock shown in FIG. 6. This RCU updater 18 is assumed to need some future expedited RCU grace period s that may be determined from the previously described expression s=((s'+3) & ~0x1). The RCU updater 18 will be entitled to acquire the rsp→exp_mutex lock 66 if it encountered no indication (from the rnp→seq_rq indicators 62 of the rcu_node structures 54 it has accessed) that any other RCU updater needing the same future expedited RCU grace period s visited any of the same rcu_node structures. In that case, the RCU updater 18 may (1) acquire the rsp→exp_mutex lock 66, (2) start a new expedited RCU grace period by incrementing the sequence counter 52A, (3) wait for the new expedited RCU grace period to elapse, and (4) release the rsp→exp_mutex lock.

The field 68 of the rcu_state structure 52 may for convenience be named rsp→exp_wait_mutex, and may be used to serialize wakeup operations involving RCU updaters 18 waiting on the rnp→exp_wq [4] arrays 64 of the rcu_node structures 54. Before an RCU updater 18 holding the rsp→exp_mutex lock 66 releases that lock at the end of an expedited RCU grace period s, the RCU updater may acquire the rsp→exp_wait_mutex lock 68. The RCU updater 18 may then release the rsp→exp_mutex lock 66 and initiate a wakeup operation that wakes up other RCU updaters waiting on waitqueues associated with the same elapsed expedited RCU grace period s.

Figure 7A:
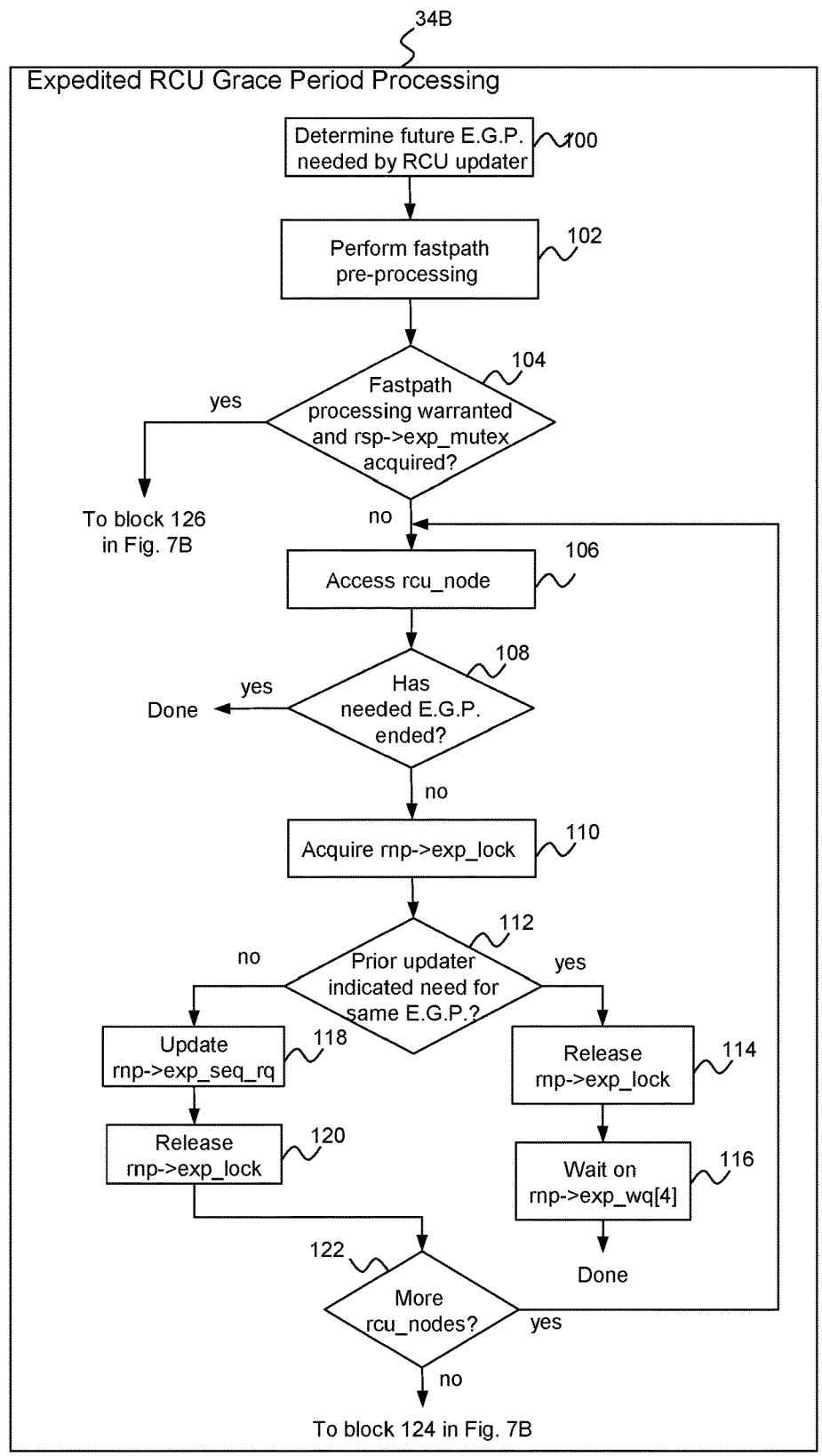
FIGS. 7A-7C show a flow diagram illustrating example expedited grace period processing that may be performed in accordance with the present disclosure.
Figure 7B:
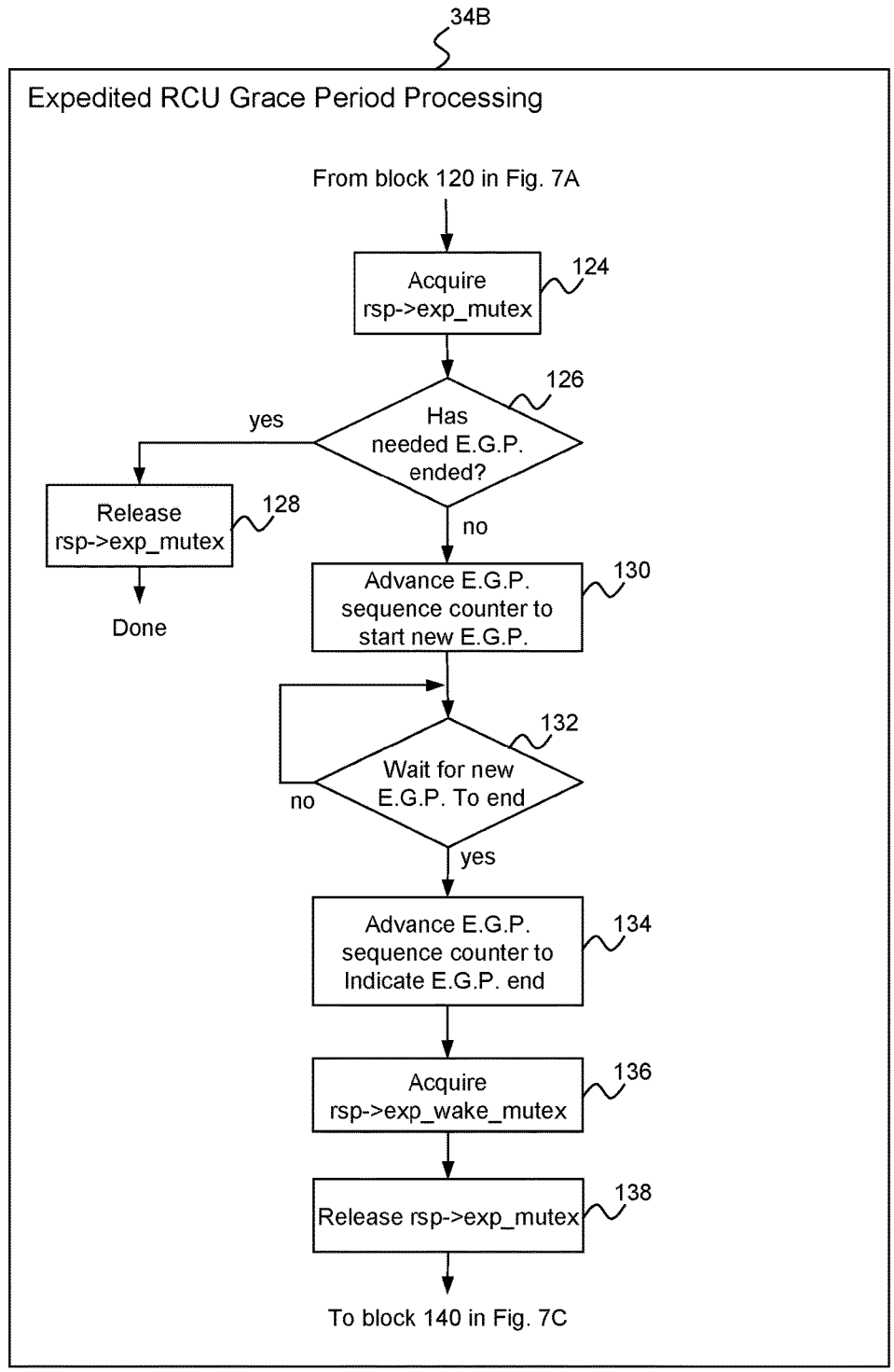
Figure 7C:
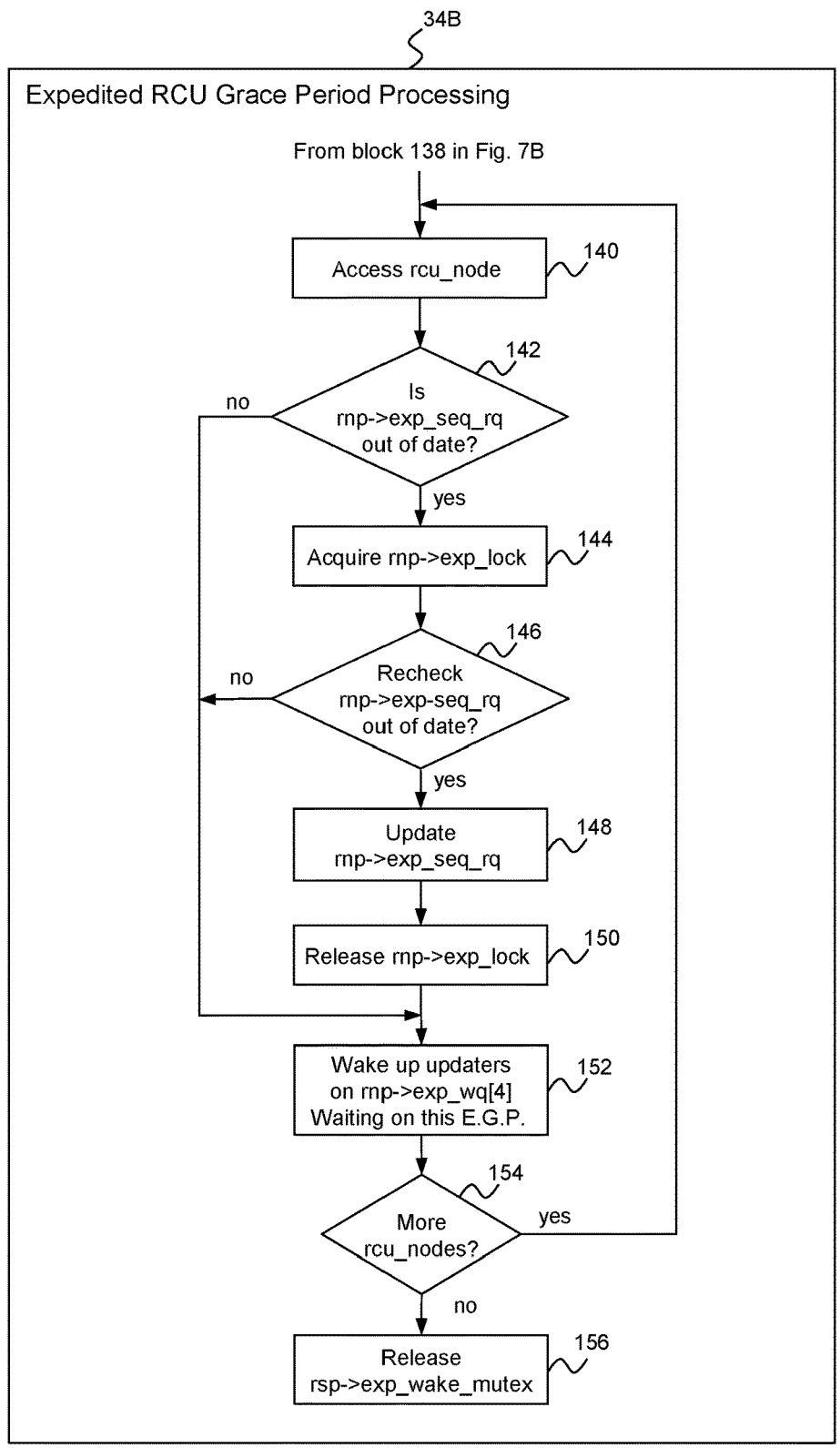

Turning now to FIGS. 7A-7C, an embodiment of the expedited RCU grace period processing component 34B will be described as a non-limiting example. Beginning in block 100 of FIG. 7A, an RCU updater 18 needing an expedited RCU grace period may snapshot the sequence counter 52A of FIGS. 5 and 6 and determine a future expedited grace period s needed to guarantee that a full expedited RCU grace period has elapsed following a current expedited RCU grace period s'. If desired, the RCU updater 18 may invoke the existing the rcu_exp_gp_seq_snap( ) function for this purpose.

In blocks 102 and 104 of FIG. 7A, the RCU updater 18 needing the expedited RCU grace period s may perform fastpath pre-processing to determine if it is eligible for fastpath expedited RCU grace period processing. This check allows the RCU updater 18 to potentially avoid excessive lock and memory contention because the fastpath processing allows the RCU updater to bypass leaf-to-root traversal of the funnel lock of FIG. 6. In the embodiment of FIGS. 7A-7C, fastpath processing begins at block 126 of FIG. 7B, described in more detail below. To determine if the RCU updater 18 is qualified for fastpath processing, the fastpath pre-processing of blocks 102/104 may access the root rcu_node structure 54 of the funnel lock, check the rnp→seq_rq indicator 62 and determine if rnp→seq_rq<s.

If false, another RCU updater needing the expedited RCU grace period s has already visited the root rcu_node structure 54 and is presumably doing the expedited RCU grace period work. In that case, the RCU updater implementing blocks 102/104 is not eligible for fast path processing. On the other hand, if the RCU updater 18 is the first updater needing the expedited RCU grace period s to arrive at the root rcu_node structure 54, it is likely to be eligible for fastpath processing. To verify, the fastpath pre-processing operation of blocks 102/104 may check to see if the rsp→exp_mutex lock 66 is already locked by another RCU updater. If it is not, the current RCU updater 18 may implement a mutex_trylock operation that checks to see if the rsp→exp_mutex lock 66 can be acquired. If either of the foregoing checks fails, the RCU updater 18 is not eligible for fastpath processing. If the RCU updater 18 passes these checks, it will have acquired the rsp→exp_mutex lock 66 and may proceed to block 126 of FIG. 7B to begin fastpath operations (see below).

If the RCU updater does not qualify for fastpath processing, it advances to block 106 of FIG. 7A to initiate a leaf-to-root traversal of the rcu_node structure funnel lock shown in FIG. 6. For each rcu_node structure 54 accessed during the leaf-to-root traversal, block 108 checks the sequence counter 52A to determine if the future expedited RCU grace period s needed by the RCU updater 18 has ended. If desired, the RCU updater 18 may invoke the existing the rcu_exp_gp_seq_done( ) function for this purpose. If true, the RCU updater's expedited RCU grace period processing work is done. If false, the RCU updater 18 acquires the rnp→exp_lock 60 in block 110 of FIG. 7A, then checks in block 112 of FIG. 7A whether another (previous) RCU updater needing the future expedited RCU grace period s has already visited the same rcu_node structure 54. As noted above, the RCU updater 18 may check the rnp→seq_rq indicator 62 and determine if rnp→seq_rq<s.

A negative result of this determination, e.g., rnp→seq_rq=s, indicates that another RCU updater 18 needing the expedited RCU grace period s did in fact already visit this rcu_node structure 54, and has set the rnp→seq_rq indicator 62. The current RCU updater 18 will defer to the previous RCU updater, release the rnp→exp_lock 60 in block 114 of FIG. 7A, then add itself to the appropriate waitqueue in the rcu_node structure's rnp→exp_wq [4] waitqueue array 64. This operation is performed in block 116 of FIG. 7A. One way that the appropriate waitqueue may be selected is by right shifting s by one bit and selecting the two low order bits (for example, using the expression s>>1 & 0x3). Following block 116, the RCU updater's expedited RCU grace period processing work is done. As described in more detail below, it will be subsequently woken up at the end of its needed expedited RCU grace period s.

If block 112 determines that rnp→seq_rq<s, meaning that no other RCU updater 18 needing the same expedited RCU grace period s has visited this rcu_node structure 54, the current RCU updater 18 may update the rnp→seq_rq indicator 62 by setting it to s in block 118, then release the rnp→exp_lock 60 in block 120. The rnp→seq_rq indicator 62 will now indicate to other RCU updaters 18 that the current RCU updater, needing the future expedited RCU grace period s, has visited this rcu_node structure 54.

Block 122 of FIG. 7A determines if there are more rcu_node structures 54 that the RCU updater 18 needs to traverse in the funnel lock hierarchy. If there are, processing returns to block 106 and the loop spanning blocks 106-120 is repeated. Once there are no more rcu_node structure's to traverse, i.e., the RCU updater 18 has reached the root rcu_node structure 54, the RCU updater proceeds to block 124 of FIG. 7B, acquires the rsp→exp_mutex lock 66, and commences fastpath processing beginning at block 126.

Block 126 of FIG. 7B checks the sequence counter 52A to determine if the future expedited RCU grace period s needed by the RCU updater 18 has ended. If true, the RCU updater's expedited RCU grace period processing work is done. If false, the RCU updater 18 advances the expedited grace period sequence counter 52A in block 130 of FIG. 7B to start a new expedited RCU grace period. In block 132 of FIG. 7B, the RCU updater 18 waits for the new expedited RCU grace period to end. Once it does, the RCU updater 18 advances the expedited grace period sequence counter 52A in block 134 of FIG. 7B to indicate that the new expedited RCU grace period has ended. The RCU updater then acquires the rsp→exp_wake_mutex lock 68 in block 136 of FIG. 7B, releases the rsp→exp_mutex lock in block 138, and proceeds to block 140 of FIG. 7C to begin wakeup processing. Note that the lock acquisition and release ordering of blocks 136 and 138 prevents a later expedited RCU grace period from starting its wakeups before a prior expedited RCU grace period. Such misordering could result in spurious wakeups.

Block 140 of FIG. 7C initiates another leaf-to-root traversal of the rcu_node structure funnel lock of FIG. 6. For each rcu_node structure 54 accessed during the leaf-to-root traversal, block 142 checks the rnp→exp_seq_rq indicator 62 to determine if it is out of date. This check may utilize the expression rnp→seq_rq<s. If the the rnp→exp_seq_rq indicator 62 is out of date, the RCU updater 18 acquires the rcu_node structure's rnp→exp_lock 60, rechecks the rnp→exp_seq_rq indicator in block 146 to determine if it remains out of date, updates the rnp→exp_seq_rq indicator in block 148 by setting it equal to s, then releases the rcu_node structure's rnp→exp_lock in block 150.

Maintaining the the rnp→exp_seq_rq indicator 62 up to date prevents two RCU updaters 18 from initiating duplicate expedited RCU grace periods corresponding to the same number s. It also prevents earlier requests for expedited RCU grace periods from being blocked by later requests. RCU updaters 18 needing different expedited RCU grace period numbers s can avoid interference by waiting on different waitqueues associated with their respective expedited RCU grace periods.

Following block 150, or if the checks performed in blocks 142 or 146 produce a false result, the RCU updater 18 proceeds to block 152 of FIG. 7C to initiate wakeups. In particular, a wakeup operation is invoked to wakeup all other RCU updaters waiting on the waitqueue of this rcu_node structure's rnp→exp_wq [4] array 64 that corresponds to expedited RCU grace period s. In an embodiment, the wakeup operation may be handled by a workqueue or other type of deferred processing so as not to delay the current RCU updater 18. The RCU updater 18 then checks for more rcu_node structures 54 in block 154 of FIG. 7C, and if the are more rcu_node structures to be processed, returns to block 140 to repeat the loop spanning blocks 140-154. Otherwise, the RCU updater 18 proceeds to block 156 and releases the rsp→exp_wake_mutex lock 68.

In an embodiment, plural kernel threads may be used to parallelize the funnel lock leaf-to-root traversal performed as part of expedited RCU grace period processing in blocks 100-122 and/or the leaf-to-root traversal performed as part of wakeup processing in blocks 140-156.

In an embodiment, for environments where expedited RCU grace periods occur much more frequently than normal RCU grace periods, a smaller rcu_node structure fanout could be used to reduce the number of children of each non-leaf rcu_node structure 18. In current versions of the Linux® kernel, the RCU_FANOUT kernel configuration parameter defaults to 64 for 64-bit systems and 32 for 32-bit systems. Reducing the fanout increases the number of levels in the rcu_node structure hierarchy, but decreases lock contention (e.g., for the rnp→exp_lock 60). If a conflict results between the desired normal and expedited RCU grace period fanout settings, a separate funnel lock node hierarchy (based on rcu_node structures 54 or other types of nodes) could be used for expedited RCU grace periods.

Accordingly, a technique for detecting expedited RCU grace periods using funnel locking with waitqueues has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-7.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for detecting expedited read-copy update (RCU) grace periods using funnel locking with waitqueues, said method comprising:
   determining, by an RCU updater, a future expedited RCU grace period needed to guarantee that a full expedited RCU grace period has elapsed following a current expedited RCU grace period;
   initiating, by said RCU updater, a leaf-to-root traversal of a funnel lock embodied as a hierarchical tree of nodes having a single top level root node, a plurality of bottom level leaf nodes, and zero or more intermediate level nodes;
   for each node of said funnel lock accessed during said leaf-to-root traversal, checking an indicator to determine if another RCU updater needing said future expedited RCU grace period has visited said node;
   if true, adding said RCU updater to a waitqueue of RCU updaters waiting for said future expedited RCU grace period;
   if false, setting said indicator to indicate that said RCU updater needing said future expedited RCU grace period has visited said node, and continuing to a next node of said funnel lock;
   if said RCU updater reaches said root node with no indication that any other RCU updater needing said future expedited RCU grace period has visited any of said nodes accessed by said RCU updater, then acquiring an expedited RCU grace period mutex lock that serializes expedited RCU grace period operations, starting a new expedited RCU grace period, waiting for said new expedited RCU grace period to elapse, releasing said expedited RCU grace period mutex lock, and initiating a wakeup operation that wakes up other RCU updaters waiting on waitqueues associated with said elapsed new expedited RCU grace period.

2. The method of claim 1, wherein said waitqueue is one of a set of per-node waitqueues maintained by said nodes.

3. The method of claim 2, wherein each of said nodes maintains an array of waitqueues that respectively queue RCU updaters waiting for different expedited RCU grace period.

4. The method of claim 3, wherein each array of waitqueues includes a first waitqueue associated with a current expedited RCU grace period, a second waitqueue associated with a previous expedited RCU grace period, and a third waitqueue associated with a next expedited RCU grace period.

5. The method of claim 1, wherein said indicator is one of a set of per-node indicators maintained by said nodes, each of said per-node indicators being protected by an indicator spinlock.

6. The method of claim 1, further including fastpath pre-processing that includes, prior to initiating said leaf-to-root traversal of said funnel lock, said RCU updater accessing said root node and performing said checking an indicator to determine if another RCU updater needing said future expedited RCU grace period has visited said root node, and if false, said RCU updater attempting acquisition of said expedited RCU grace period mutex lock, and if acquired, performing fastpath processing that includes starting said new expedited RCU grace period, waiting for said new expedited RCU grace period to elapse, releasing said expedited RCU grace period mutex lock, and initiating said wakeup operation that wakes up other RCU updaters waiting on waitqueues associated with said elapsed new expedited RCU grace period.

7. The method of claim 1, further including checking for said future expedited grace period each time said RCU updater accesses one of said nodes.

8. A system, comprising:
   a plurality of CPUs;
   a memory coupled to said CPUs, said memory including a computer readable storage medium tangibly embodying at least one program of instructions executable by said CPUs to perform operations for detecting expedited read-copy update (RCU) grace periods using funnel locking with waitqueues, said operations comprising:
   determining, by an RCU updater, a future expedited RCU grace period needed to guarantee that a full expedited RCU grace period has elapsed following a current expedited RCU grace period;
   initiating, by said RCU updater, a leaf-to-root traversal of a funnel lock embodied as a hierarchical tree of nodes having a single top level root node, a plurality of bottom level leaf nodes, and zero or more intermediate level nodes;
   for each node of said funnel lock accessed during said leaf-to-root traversal, checking an indicator to determine if another RCU updater needing said future expedited RCU grace period has visited said node;
   if true, adding said RCU updater to a waitqueue of RCU updaters waiting for said future expedited RCU grace period;
   if false, setting said indicator to indicate that said RCU updater needing said future expedited RCU grace period has visited said node, and continuing to a next node of said funnel lock;
   if said RCU updater reaches said root node with no indication that any other RCU updater needing said future expedited RCU grace period has visited any of said nodes accessed by said RCU updater, then acquiring an expedited RCU grace period mutex lock that serializes expedited RCU grace period operations, starting a new expedited RCU grace period, waiting for said new expedited RCU grace period to elapse, releasing said expedited RCU grace period mutex lock, and initiating a wakeup operation that wakes up other RCU updaters waiting on waitqueues associated with said elapsed new expedited RCU grace period.

9. The system of claim 8, wherein said waitqueue is one of a set of per-node waitqueues maintained by said nodes.

10. The system of claim 9, wherein each of said nodes maintains an array of waitqueues that respectively queue RCU updaters waiting for different expedited RCU grace period.

11. The system of claim 10, wherein each array of waitqueues includes a first waitqueue associated with a current expedited RCU grace period, a second waitqueue associated with a previous expedited RCU grace period, and a third waitqueue associated with a next expedited RCU grace period.

12. The system of claim 8, wherein said indicator is one of a set of per-node indicators maintained by said nodes, each of said per-node indicators being protected by an indicator spinlock.

13. The system of claim 8, further including fastpath pre-processing that includes, prior to initiating said leaf-to-root traversal of said funnel lock, said RCU updater accessing said root node and performing said checking an indicator to determine if another RCU updater needing said future expedited RCU grace period has visited said root node, and if false, said RCU updater attempting acquisition of said expedited RCU grace period mutex lock, and if acquired, performing fastpath processing that includes starting said new expedited RCU grace period, waiting for said new expedited RCU grace period to elapse, releasing said expedited RCU grace period mutex lock, and initiating said wakeup operation that wakes up other RCU updaters waiting on waitqueues associated with said elapsed new expedited RCU grace period.

14. The system of claim 8, further including checking for said future expedited grace period each time said RCU updater accesses one of said nodes.

15. A computer program product, comprising:
one or more computer readable data storage media;
program instructions stored on said one or more computer readable data storage media for programming a data processing platform having a plurality of CPUs to perform operations for detecting expedited read-copy update (RCU) grace periods using funnel locking with waitqueues, said operations comprising:
determining, by an RCU updater, a future expedited RCU grace period needed to guarantee that a full expedited RCU grace period has elapsed following a current expedited RCU grace period;
initiating, by said RCU updater, a leaf-to-root traversal of a funnel lock embodied as a hierarchical tree of nodes having a single top level root node, a plurality of bottom level leaf nodes, and zero or more intermediate level nodes;
for each node of said funnel lock accessed during said leaf-to-root traversal, checking an indicator to determine if another RCU updater needing said future expedited RCU grace period has visited said node;
if true, adding said RCU updater to a waitqueue of RCU updaters waiting for said future expedited RCU grace period;
if false, setting said indicator to indicate that said RCU updater needing said future expedited RCU grace period has visited said node, and continuing to a next node of said funnel lock;
if said RCU updater reaches said root node with no indication that any other RCU updater needing said future expedited RCU grace period has visited any of said nodes accessed by said RCU updater, then acquiring an expedited RCU grace period mutex lock that serializes expedited RCU grace period operations, starting a new expedited RCU grace period, waiting for said new expedited RCU grace period to elapse, releasing said expedited RCU grace period mutex lock, and initiating a wakeup operation that wakes up other RCU updaters waiting on waitqueues associated with said elapsed new expedited RCU grace period.

16. The computer program product of claim 15, wherein said waitqueue is one of a set of per-node waitqueues maintained by said nodes.

17. The computer program product of claim 16, wherein each of said nodes maintains an array of waitqueues that respectively queue RCU updaters waiting for different expedited RCU grace period.

18. The computer program product of claim 17, wherein each array of waitqueues includes a first waitqueue associated with a current expedited RCU grace period, a second waitqueue associated with a previous expedited RCU grace period, and a third waitqueue associated with a next expedited RCU grace period.

19. The computer program product of claim 15, wherein said indicator is one of a set of per-node indicators maintained by said nodes, each of said per-node indicators being protected by an indicator spinlock.

20. The computer program product of claim 15, further including fastpath pre-processing that includes, prior to initiating said leaf-to-root traversal of said funnel lock, said RCU updater accessing said root node and performing said checking an indicator to determine if another RCU updater needing said future expedited RCU grace period has visited said root node, and if false, said RCU updater attempting acquisition of said expedited RCU grace period mutex lock, and if acquired, performing fastpath processing that includes starting said new expedited RCU grace period, waiting for said new expedited RCU grace period to elapse, releasing said expedited RCU grace period mutex lock, and initiating said wakeup operation that wakes up other RCU updaters waiting on waitqueues associated with said elapsed new expedited RCU grace period.

* * * * *